United States Patent
Pfannenstiel et al.

(10) Patent No.: US 11,019,829 B2
(45) Date of Patent: Jun. 1, 2021

(54) MODULAR COMESTIBLES PROCESSING UNITS

(71) Applicant: DIRIGO FOOD SAFETY, LLC, Strongsville, OH (US)

(72) Inventors: Michele T. Pfannenstiel, Cumberland, ME (US); Nathan Colello Gilmour, Yarmouth, ME (US)

(73) Assignee: DIRIGO FOOD SAFETY, LLC, Strongsville, OH (US)

(*) Notice: Subject to any disclaimer, the term of this patent is extended or adjusted under 35 U.S.C. 154(b) by 700 days.

(21) Appl. No.: 15/718,234

(22) Filed: Sep. 28, 2017

(65) Prior Publication Data

US 2018/0084794 A1    Mar. 29, 2018

Related U.S. Application Data

(60) Provisional application No. 62/401,184, filed on Sep. 29, 2016.

(51) Int. Cl.
| | |
|---|---|
| A22C 18/00 | (2006.01) |
| A22C 15/00 | (2006.01) |
| A22C 17/00 | (2006.01) |
| A23N 12/00 | (2006.01) |

(52) U.S. Cl.
CPC .............. *A22C 18/00* (2013.01); *A22C 15/00* (2013.01); *A22C 17/0093* (2013.01); *A23N 12/00* (2013.01)

(58) Field of Classification Search
CPC .................................................... A22C 18/00
USPC .................... 452/177, 178, 182, 183, 198
See application file for complete search history.

(56) References Cited

U.S. PATENT DOCUMENTS

| | | | |
|---|---|---|---|
| 3,940,830 | A | 3/1976 | Anderson et al. |
| 4,011,629 | A | 3/1977 | Laursen |
| 4,179,021 | A | 12/1979 | Wallace |
| 4,320,559 | A | 3/1982 | Couture |
| 4,381,582 | A | 5/1983 | Korhonen |
| 4,688,296 | A | 8/1987 | Clarke et al. |
| 5,246,396 | A | 9/1993 | Schumann et al. |
| 5,376,041 | A | 12/1994 | Schumann |
| 5,397,263 | A | 3/1995 | Schumann et al. |
| 5,405,289 | A | 4/1995 | Schumann et al. |

(Continued)

OTHER PUBLICATIONS

International Search Report and Written Opinion for application No. PCT/US2017/053877 dated Dec. 11, 2017.

*Primary Examiner* — Richard T Price, Jr.
(74) *Attorney, Agent, or Firm* — Lando & Anastasi, LLP

(57) ABSTRACT

Disclosed are various embodiments of either self-contained, separate or combinations thereof of modular units for the processing of comestible products. The modular unit is configured with sections to create hygienic zoning of food to be processed. The modular unit is can contain components to process food from a raw state, such as an animal carcass or freshly harvested produce, through primary and (optionally) secondary processing. The modular unit can be utilized to process various types of food, and, therefore, the modular unit is provided in various embodiments depending on the food to be processed therein, and the types of processing that are desired. The modular unit is constructed and the sections therein are configured such that as the food undergoes processing, it flows through the sections of the modular unit in an orderly manner, which helps to minimize or prevent food safety problems, such as cross contamination.

27 Claims, 3 Drawing Sheets

(56) References Cited

U.S. PATENT DOCUMENTS

| | | |
|---|---|---|
| 5,538,466 A | 7/1996 | Sandstrom |
| 5,569,071 A | 10/1996 | Metier et al. |
| 5,937,080 A | 8/1999 | Vogeley, Jr. et al. |
| 5,980,377 A | 11/1999 | Zwanikken et al. |
| 6,545,604 B1 | 4/2003 | Dando |
| 6,796,892 B2 | 9/2004 | Allen et al. |
| 6,939,216 B2 | 9/2005 | Long |
| 7,118,470 B2 | 10/2006 | Long |
| 7,163,451 B1 | 1/2007 | Poitras |
| 7,234,421 B2 | 6/2007 | Natividade et al. |
| 7,272,939 B2 | 9/2007 | Salmons et al. |
| 7,645,472 B2 | 1/2010 | Walker et al. |
| RE41,562 E | 8/2010 | Dando et al. |
| RE41,815 E | 10/2010 | Dando et al. |
| 7,811,158 B2 | 10/2010 | Long |
| 7,828,639 B2 | 11/2010 | Nielsen |
| 7,837,539 B2 | 11/2010 | Knopik et al. |
| 8,002,613 B2 | 8/2011 | Allen et al. |
| RE42,821 E | 10/2011 | Dando et al. |
| 8,079,897 B2 | 12/2011 | Knopik et al. |
| RE44,409 E | 8/2013 | Dando et al. |
| 8,572,864 B2 | 11/2013 | Wieck |
| 8,672,731 B2 | 3/2014 | Long |
| 8,870,636 B2 | 10/2014 | Krebsbach et al. |
| 2002/0077055 A1 | 6/2002 | Allen et al. |
| 2003/0008605 A1 | 1/2003 | Hartford et al. |
| 2003/0022613 A1 | 1/2003 | Breukelman |
| 2004/0040513 A1 | 3/2004 | Long |
| 2004/0149140 A1 | 8/2004 | Long |
| 2004/0259489 A1 | 12/2004 | Christensen |
| 2005/0042980 A1 | 2/2005 | Allen et al. |
| 2005/0069613 A1 | 3/2005 | Walker et al. |
| 2005/0186896 A1 | 8/2005 | Nielsen |
| 2005/0238696 A1 | 10/2005 | Long |
| 2005/0241322 A1 | 11/2005 | Salmons et al. |
| 2007/0026778 A1 | 2/2007 | Poitras |
| 2008/0152567 A1 | 6/2008 | Killough |
| 2009/0130964 A1 | 5/2009 | Knopik et al. |
| 2010/0068357 A1 | 3/2010 | Osborn |
| 2010/0317270 A1 | 12/2010 | Jorgensen |
| 2010/0317273 A1 | 12/2010 | Knopik et al. |
| 2011/0023786 A1 | 2/2011 | Long |
| 2011/0263188 A1 | 10/2011 | Allen et al. |
| 2013/0072099 A1 | 3/2013 | Krebsbach et al. |
| 2013/0101714 A1 | 4/2013 | Buehler |
| 2014/0035730 A1 | 2/2014 | Dando et al. |
| 2014/0235152 A1 | 8/2014 | Long |
| 2014/0287667 A1 | 9/2014 | Zanotti et al. |
| 2014/0338610 A1 | 11/2014 | Zanotti et al. |
| 2015/0250192 A1 | 9/2015 | Thulin et al. |

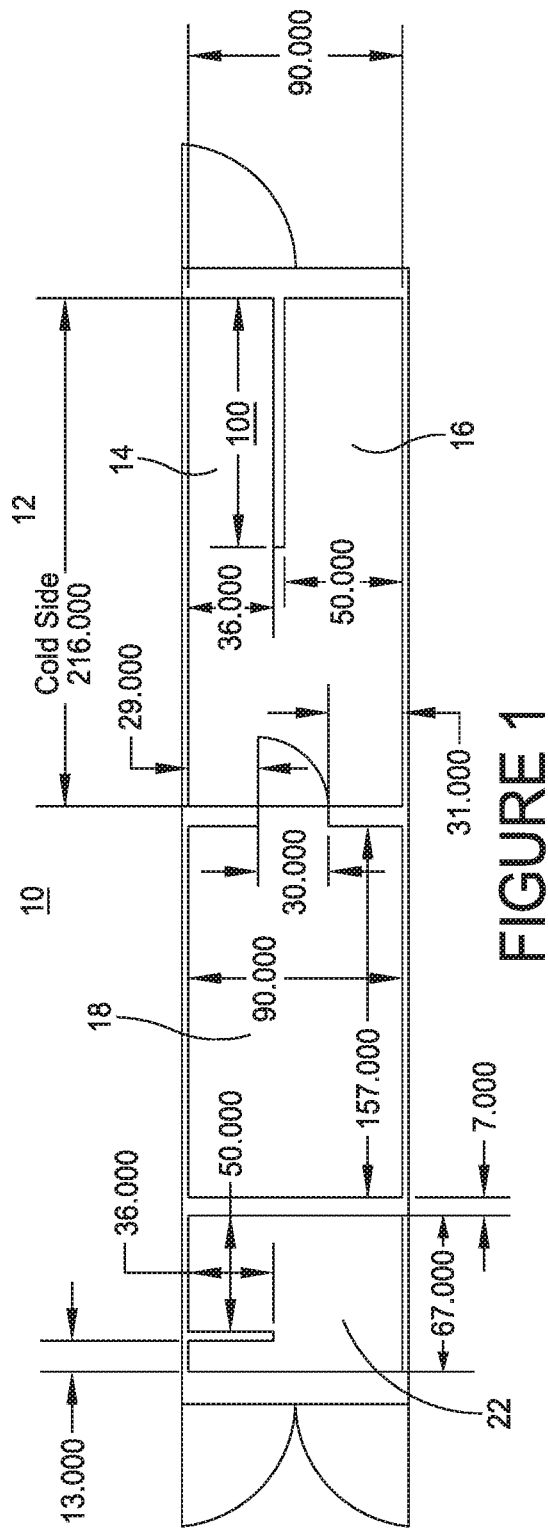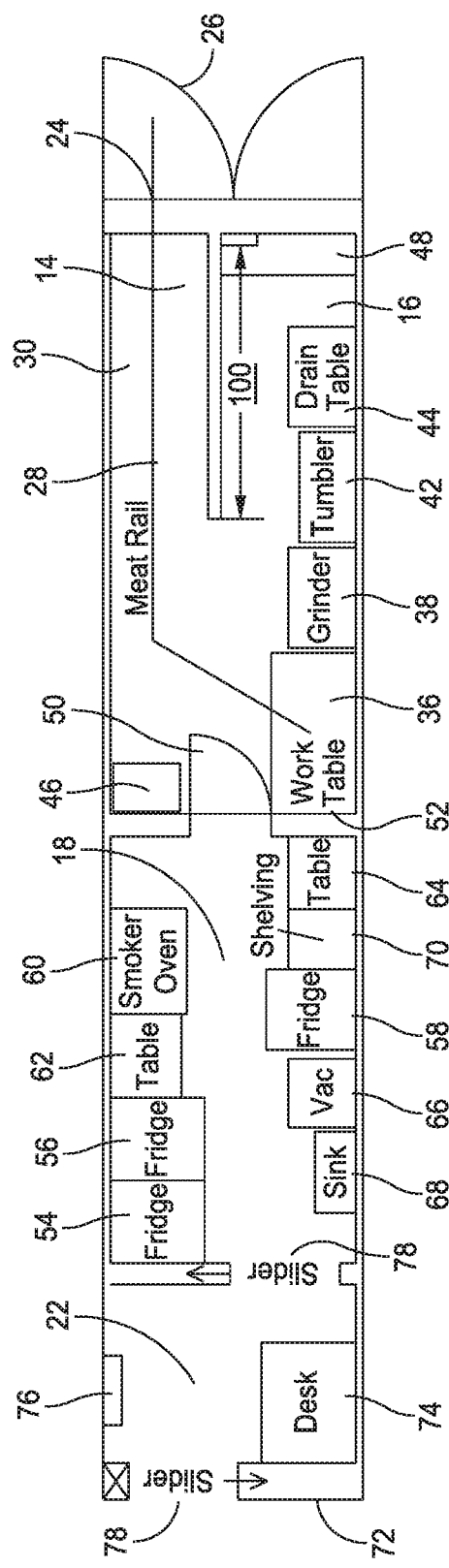

MODULAR COMESTIBLES PROCESSING UNITS

CROSS-REFERENCE TO RELATED APPLICATIONS

This application claims the benefit under 35 U.S.C. § 119(e) to U.S. Provisional Application Ser. No. 62/401,184 titled "MODULAR COMESTIBLES PROCESSING UNITS," filed Sep. 29, 2016, which is incorporated by reference herein in its entirety for all purposes.

FIELD

This application relates to modules and systems for the processing of comestible items, such as produce, fish, and meat carcasses.

BACKGROUND

There is a severe lack of access to meat cut and wrap facility capacity and value added processing facility capacity. Current facility owners seem unwilling to work with new entrepreneurs to increase volume into the regional meats system, and the current capacity is not up to modern standards. One of the major bottlenecks of slaughter capacity is hanging and cooling space. Cooling large carcasses with the proper airflow and space to bring the temperature to within mandated guidelines is an energy and paperwork intensive process. Every small slaughterhouse has a cut and wrap facility. In addition, some mid-size farms house their own cut and wrap facilities, and the demand is high for more such facilities to be created. The cut and wrap facility thus represents another major bottleneck in providing local meat. Further constraints occur in value added production. The demand for charcuterie (smoked and further processed meat products) is growing each year; every foodie restaurant is clamoring for a charcuterie plate, and local food customers are increasing the demand as well. Suitable facilities to safely produce Ready-to-Eat (RTE) food products are in short supply.

Historically, there are two ways to increase licensed slaughter capacity: build a standalone facility and develop the business and regulatory systems that make it inspectable and profitable; or buy a mobile slaughter unit and develop the business and regulatory systems that make it inspectable and profitable. Problems with the first option include land acquisition, water availability, sewage capacity and electric capacity in a given location. Finding a suitable piece of land where the neighbors will not complain about a slaughterhouse is difficult. Problems with the second option (mobile slaughter unit) include the logistics of finding trained labor at outlying locations, lack of suitable water, sewage and electric capacity at farms, and the ensuing cost of bringing those utilities to the mobile unit at the farm. Further, if the mobile unit is to travel, hours of travel time from farm to farm significantly reduces the productive time the unit could be working. Mobile units also lack the capacity for storing or aging carcasses, and present a food defense risk, i.e. it is difficult to secure the food, when parked in outlying areas.

Similarly, there is a need in the general food-production industry for small, self-contained food processing facilities, such as for the on-site or local processing of produce or other non-meat comestibles in compliance with local, state, and federal food safety regulations.

SUMMARY

Described herein are modular structure units for the processing of comestible products. The modular unit is configured with sections to create hygienic zoning of food to be processed. The modular unit is a structural body or bodies that can contain components to process food from a raw state, such as an animal carcass or freshly harvested produce, through primary and (optionally) secondary processing. The modular unit can be utilized to process various types of food, and, therefore, the modular unit is provided in various embodiments depending on the food to be processed therein, and the types of processing that are desired. The modular unit is constructed and the sections therein are configured such that as the food undergoes processing, it flows through the sections of the modular unit in an orderly manner, which helps to minimize or prevent food safety problems, such as cross contamination.

One embodiment of a modular structure includes sections to create hygienic zoning of food to be processed. The modular structure comprises an ingress from an exterior of the modular structure at one end of the modular structure, a first section that is directly accessible through the ingress, and a primary processing section for processing food, that is connected directly to and isolated from the first section to provide the hygienic zoning.

Aspects of this embodiment of the modular structure can include that the first processing section is configured to be climate controlled by at least one refrigeration unit. Another aspect of this embodiment of the modular structure can include that the primary processing section is also configured to be climate controlled by at least one refrigeration unit.

Aspects of this embodiment of the modular structure can include that the primary processing section is insulated.

Aspects of this embodiment of the modular structure can include that walls, ceiling, and floor of at least the first section and the primary processing section are lined with a non-porous, cleanable surface.

Aspects of this embodiment of the modular structure can include that the primary processing area is wired with one or more electrical connections and lighting.

Aspects of this embodiment of the modular structure can include that the primary processing section has a drain that is configured to be connectable to a sewer system or other waste disposal system.

Aspects of this embodiment of the modular structure can include that the first section and the primary processing section further comprise an overhead rail system for supporting and transporting food between the first section and the primary processing section.

Aspects of this embodiment of the modular structure can include a secondary processing section that is connected to but isolated from the primary processing section that is configured for additional processing of the food to be processed after being processed in the primary processing area.

Aspects of this embodiment of the modular structure can include that the secondary processing section is configured to be cooled by at least one cooling unit and is insulated.

Aspects of this embodiment of the modular structure can include that walls, ceiling, and floor of the secondary processing section are lined with a non-porous, cleanable surface.

Aspects of this embodiment of the modular structure can include that the secondary processing area is wired with one or more electrical connections and lighting.

Aspects of this embodiment of the modular structure can include that the secondary processing section contains one or more of a work table, storage shelving, a storage cabinet, a refrigerator, a freezer, an oven, a sink, a vacuum sealer, and a smoker.

Aspects of this embodiment of the modular structure can include an office section connected and isolated from the first processing section.

Aspects of this embodiment of the modular structure can include that the office section is wired with one or more electrical connections and for lighting.

Aspects of this embodiment of the modular structure can include the office section having a second ingress from the exterior of the modular structure.

Aspects of this embodiment of the modular structure can include a second ingress from the exterior of the structure into the interior at a second end of the modular structure.

Aspects of this embodiment of the modular structure can include that the modular structure comprises a commercial shipping container.

Aspects of this embodiment of the modular structure can include at least one additional storage section.

Aspects of this embodiment of the modular structure can include that the modular structure is configured to process animal carcasses.

Aspects of this embodiment of the modular structure can include that the primary processing section contains one or more of a work table, a meat grinder, a meat mixer/tumbler, a sink, and a storage cabinet.

Aspects of this embodiment of the modular structure can include that the modular structure is configured to process fish and/or seafood.

Aspects of this embodiment of the modular structure can include that the modular structure is configured to process produce.

Aspects of this embodiment of the modular structure can include that the modular structure is configured to process a liquid.

Aspects of this embodiment of the modular structure can include that the modular structure is a substantially rectangular structure, having a first and second shorter walls and first and second longer walls and the ingress is in a first shorter wall.

Certain embodiments of the units have at least an ingress from the exterior of the mobile structure; a refrigerated section for receiving, cooling and/or storing (raw) food to be processed, that is directly accessible through the ingress; a primary processing area (optionally refrigerated) for processing food, connected directly to the refrigerated section, and having a floor drain connectable to a sewer system or other waste disposal system; an overhead rail system or other transport system for supporting and transporting food between the refrigerated section and the primary processing area; and an office section, with an ingress from the exterior of the mobile structure, wherein at least the refrigerated section and the primary processing area are insulated and lined on walls, ceiling, and floor with a non-porous, cleanable surface; and wherein at least the primary processing area and the office section are wired for one or more electrical connection and lighted.

Optionally, in certain embodiments, the described modular structures further include a secondary processing area for value added or further processing of foods first processed in the primary processing area, which is wired for one or more electrical connection(s), and lighted, and contains air handling control to maintain specific temperatures.

In provided examples of modular structures for the processing of comestible products, the modular structures are configured and arranged to process any or all of animal carcasses or parts thereof; fish or parts thereof, produce; milk or another liquid.

In various aspects, it is understood that the modular structure of any one of the embodiments may be built/constructed using a recycled or converted shipping container or shipping trailer.

Also provided in another embodiment is a modular structure for the processing of animal or fish carcasses, comprising a substantially rectangular structure, having a floor, a ceiling, and four exterior walls, two of the walls being longer than the other two to provide a rectangular structure; a first doorway from the exterior of the structure into the interior disposed in one shorter wall of the structure; a refrigerated section for receiving, cooling and/or storing animal carcasses or portions thereof to be processed, directly accessible through the first doorway, that is lined on its interior walls, ceiling, and floor with a non-porous, cleanable surface; a primary processing section for processing the animal carcasses, connected directly to the refrigerated section with an intervening access way and having a floor drain connectable to a sewer system or other waste disposal system, is lined on its interior walls, ceiling, and floor with a non-porous, cleanable surface, and has one or more electronic outlets and electric lighting; a secondary processing section for value added processing of meat processed from the carcasses in the primary processing area, which secondary processing area is lined on its interior walls, ceiling, and floor with a non-porous, cleanable surface, and has one or more electronic outlets and electric lighting, which secondary processing section is connected to the primary processing section by a closeable door in an interior wall between the two sections; a second doorway from the exterior of the structure into the interior in the other shorter wall of the structure; and an office section, directly accessible through the second doorway, wired for one or more electrical connection(s), and lighted, which office section is connected to the secondary processing section by a closeable door in an interior wall between the two sections. Aspects of this embodiment can include an optional overhead rail system for supporting and moving the carcasses between the refrigerated section and the primary processing section;

In examples of this modular structure embodiment, the substantially rectangular structure comprises (was built from or based on) a commercial shipping container or truck trailer.

Optionally, the primary processing section of any of the provided modular structures contains one or more of the following: work table(s), a meat grinder, a meat mixer/tumbler, sink(s), or storage cabinet(s). Optionally, the secondary processing section of any of the provided modular structures contains one or more of the following: work table(s), storage shelving, storage cabinet(s), refrigerator(s), freezer(s), oven(s), sink(s), a vacuum sealer, or a smoker. Optionally, the office section of any of the provided modular structures contains at least one desk. Optionally, the storage section of any of the modular structures contains non-porous, cleanable food safe surfaces. Thus there is provided in another specific embodiment, a modular structure for processing animal carcasses, comprising a substantially rectangular structure that is a converted commercial shipping container or truck trailer; a primary processing section containing at least one work table, a meat grinder, a meat mixer/tumbler, sink(s), and at least one storage cabinet; a secondary processing section containing at least one work table, storage shelving, at least one refrigerator, sink(s), a vacuum sealer, and a smoker; and an office section containing at least one desk.

It is contemplated that any of the provided modular units for the processing of comestible products may be lighted in at least one section using LED lighting.

It is contemplated that any of the provided modular units can be provided with various combinations of the herein described aspects and features.

The foregoing and other objects, features, and advantages of the invention will become more apparent from the following detailed description, which proceeds with reference to the accompanying figures.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 1 is a drawing of a representative example of dimensions of a modular comestibles processing unit;

FIG. 2 is a drawing of a representative example of a modular comestibles processing unit;

DETAILED DESCRIPTION

Figure 3:
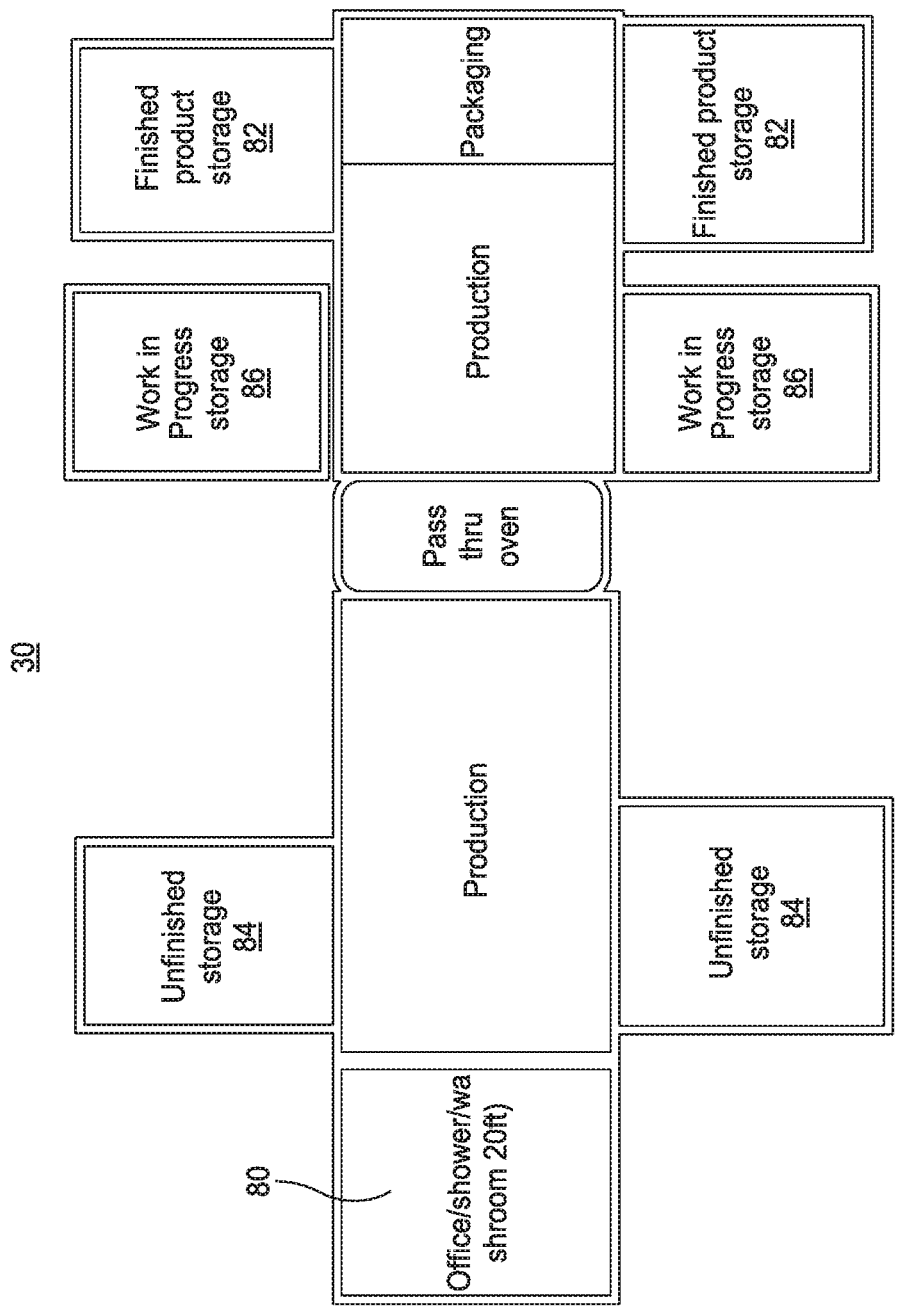
FIG. 3 is a drawing of another representative example of modular comestibles processing unit having an office container and storage containers.

Described herein are aspects and embodiments of modular structures units (so-called The Locker) for the processing of comestible products. Examples of such units can include any combination of the following: an ingress from the exterior of the mobile structure; a refrigerated section for receiving, cooling and/or storing (raw) food to be processed, directly accessible through the ingress; a primary processing area (optionally refrigerated) for processing food, connected directly to the refrigerated section, having a floor drain connectable to a sewer system or other waste disposal system; and an office section, with an ingress from the exterior of the mobile structure. Aspects and embodiments of the refrigerated section and the primary processing area can be insulated. Aspects and embodiments of the refrigerated section and the primary processing area can be lined on any or all of the walls, ceiling, and floor with a non-porous, cleanable surface. Aspects and embodiments of the primary processing area and the office section can be wired with one or more electrical connection(s) and lighted. Aspects and embodiments of the refrigerated section and the primary processing area can include an optional overhead rail system or other transport system for supporting and transporting food between the refrigerated section and the primary processing area. Aspects and embodiments of the modular structure can further include a secondary processing area for secondary processing (e.g., value added processing) of foods first processed in the primary processing area. Aspects and embodiments of the secondary processing area can be wired for one or more electrical connection(s), and lighted.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Referring to FIG. 1, there is illustrated a representative example of a modular comestibles processing unit 10, showing a "cold side" 12 having a refrigeration 14 and primary processing sections 16 that are distinct from the other sub-compartments such as the secondary processing unit 18 and the office 22. FIG. 1 is illustrates with representative but non-limiting dimensions (in inches); the illustrated modular processing unit 10 is based on a ~40 foot container or trailer. Only the outline of walls (none of the interior details) and doors are shown in the illustration in FIG. 1

Referring to FIG. 2, there is illustrated an exemplary unit 20 that is configured for the processing (primary and optional secondary/value added) of meat carcasses such as beef quarters, pork halves, lamb, deer, etc. The movement of a carcass to be processed is originated from an upper right corner 24 where the carcass enters the first refrigeration area 14 through a doorway 26 (for instance, one door of bay doors provided at the back of a converted commercial shipping container or trailer unit). A carcass is hung on a provided rail system 28, within the first refrigerated section 14, which section is illustrated by way of example to be about 100 inches in length in this embodiment. The refrigerated section 32 can be partitioned from a primary processing section 34 adjacent thereto, for instance by a strip curtain-covered doorway that helps to contain cooled air in the refrigerated section. The meat rail extends beyond the refrigerated section (through the strip curtain or doorway) into the primary processing area 16, for instance to an optional work table 36 as illustrated. Also illustrated in the represented primary processing area are options of any of a meat grinder 38, a meat tumbler 42, a drain table 44, a storage cabinet 46, and a sink or sink complex 48 (such as a triple sink station). Although not illustrated, a floor drain for coupling the unit to a waste system can be provided. Optionally, the primary processing section may contain a water heater unit (not illustrated), such as an in-line or other space efficient water heater unit. In the illustrated embodiment, the primary processing section 16 is directly adjacent to a secondary processing (value added processing) section 18, and connected thereto by a closeable door 50 through an interior wall 52 between the two sections. The secondary processing section 18 as illustrated contains optional aspects such as multiple refrigeration units 54, 56, 58 (three are pictured), a smoker oven 60, two tables 62, 64, a vacuum packaging unit 66, a sink 68, and storage shelving 70. Optionally, this secondary processing section may contain a water heater unit (not illustrated), such as an in-line or other space efficient water heater unit.

A carcass to be processed after being moved from storage in the first refrigeration section 14 to the primary processing section 16 undergoes primary processing (for example butchering) in the primary processing section. This may include cutting and wrapping of muscle or organ meats, grinding and/or mixing of meats and other components, and optionally additional preparation. Meat cuts that are prepared in the primary processing 16 section may optionally be moved to the secondary processing section 18 of the unit for further processing, for instance to produce value added products such as sausage, preserved (cured) muscle meats, smoked products, and so forth. The secondary processing section may also contain devices and supplies for packaging of processed meat, including value added meat products. The refrigerated section 14, primary processing section 16 and secondary processing section 18 of the modular unit are preferably "clean" facilities, wherein the walls, ceiling, and floor of these sections are lined with a non-porous, cleanable surface, thus permitting convenient and effective cleaning of these sections to comply with food-safety regulations.

In contrast, the office section 22 of the unit need, which is usually disposed at an opposite end 72 of the modular unit to the entrance 26 through which carcasses enter the unit. The office section 22 need not be a "clean" room, though that is also an option. The office can optionally contain for instance a desk 74, electrical outlet(s) and lighting (not illustrated), and optionally an electrical panel 76 which can be accessed to control electric power for the entire unit (including for instance power to outlets or in-wired devices in the office, primary and/or secondary processing sections), lighting for section(s) within the unit, as well as the refrigeration devices (e.g., compressor(s)) that cool the refrigeration section and optionally other section(s) of the unit. As illustrated, the doors 78 leading into and out of the office section are pocket doors, though this is not essential to the design (any type of doors can be used).

Figure 4:
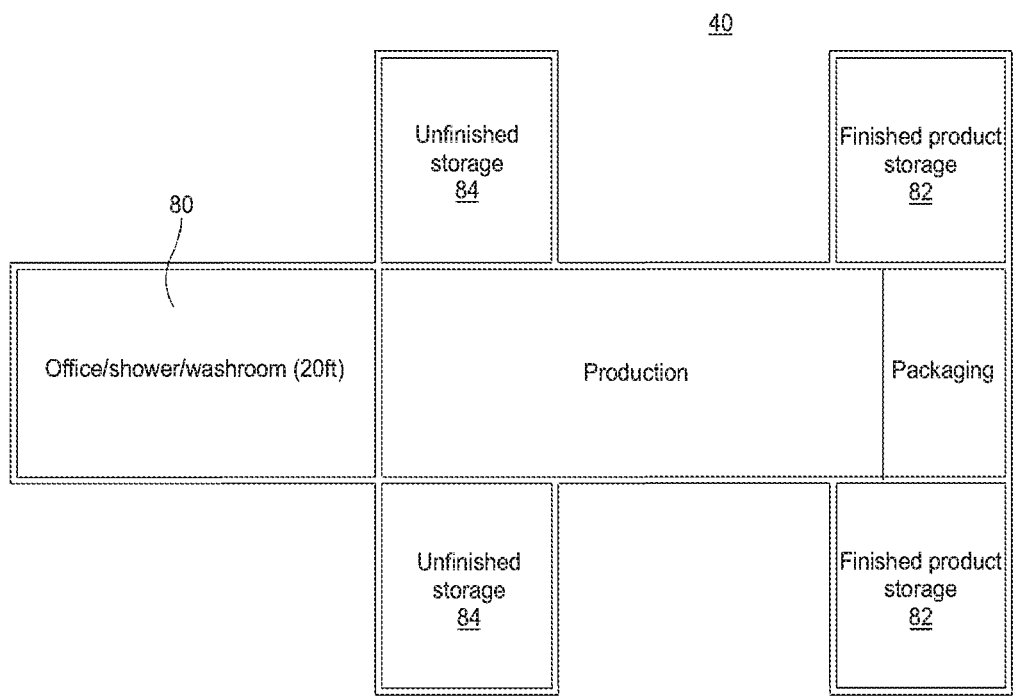
FIG. 4 is a drawing of another representative example of modular comestibles processing unit having an office container and storage containers.

Referring to FIGS. 3-4, there are illustrated additional exemplary embodiments of modular units 30, 40 depicting further variations that can be made to any of the modular structures. For example, any on the embodiments of modular units can have a segregated office section 80 and optional storage containers (unfished storage section 84, work in progress section 86 and finished product section 82. These embodiments are illustrated as containing a separate modular office space section and sections, which promote hygienic zoning and further provided more production space.

In another embodiment (not illustrated) there is provided a modular cooling/storage area 14 or 84, cut and wrap (processing) area 16, and value added processing area 18 and system that can be used to process and provide Global Food Safety Initiative (GFSI) auditable, U.S. Department of Agriculture (USDA) or state inspectable, safe, wholesome, local meat (or other comestible products) into markets. Potential components of this embodiment include, but are not limited to a cooling unit or section 12, a modular or standing cut and wrap unit or section, a secondary processing (e.g., smokehouse/curing) unit or section, and any or all of a retail sales counter and an office that can be outfitted with a software and management package. The software and management package may include food and worker safety, training, audit and metrics software needed to run a USDA/GFSI level facility.

It is appreciated that each modular component descried herein can be provided separately and utilized with or within an existing food (for instance, meat) processing infrastructure. It is also envisioned that a modular processing unit can itself be a basic self-contained modular processing facility that can include a cooling/storage section 14, a primary processing (e.g., cut and wrap) section 16, and an office sections/areas 22. The modular units can be delivered to, for instance, existing industrial parks with water, sewer and electric capacity already in existence, thus making hooking up the modular units to these utilities routine. The units can be used outside of the U.S., for instance to service the growing population that wants to purchase wholesome food and meat.

It is appreciated that the slaughter, cut and wrap, and value added modules can be engineered and fabricated to order. In one embodiment, the foundation of the module to be customized starts with any of a storage container, a moveable trailer or trailer bed (for instance, purchased after-market). In aspects and embodiments, modules are built using a standardized plan with optional modifications customizable to the end user or target market.

In some embodiments, the module is provided with business, software, and/or food safety plans that would enable acceptance by regulatory authorities, as well as ensuring effective running of the food processing plant. Optionally, the modular system can be used for training of personnel in food safety and business operations to conform to selected standards.

Modular Units (Structures) for the Processing of Comestible Products

According to aspects of this disclosure, the modular units are made of repurposed insulated shipping containers. The interior of such units can be designed to create a cleanable space, particularly in those areas within the unit that will be used for cooling and storage, as well as processing (e.g., primary and/or secondary). Production of wholesome food requires spaces that do not create a hazard to the food. By creating smooth, non-porous walls and a sealed, non-porous floor, both pest and filth hazard exclusions are built into the unit.

Processing food requires potable water as well. The units are configured to hook up to a local potable water source. Sewage is also important and the unit is configured to have drainage that reduces food hazards and hooks into a site sewage system. Electric power to run processing equipment and refrigeration is also necessary, and the unit is configured to hook into the local electric system with an integral (e.g., internal) panel.

While the unit is originally envisioned for meat processing (e.g., processing of red meat or white meat), it is suitable for many types of climate controlled food production. Many types of food production require the same level of cleanability, water, sewage and electricity.

General Construction of Modular Units

One embodiment of the modular unit is a single structural body that can contain all of the components necessary to process food from a raw state, such as an animal carcass or freshly harvested produce, through primary and (optionally) secondary processing. The modular unit can be utilized to process various types of food, and, therefore, the modular unit is provided with various aspects and in various embodiments depending on the food to be processed therein, and the types of processing that are desired.

In some embodiments, the modular unit can be derived from recycling a construction with an alternative original purpose, such as an insulated shipping container that was originally constructed, for example, to survive cross ocean transport. By design, such shipping containers are configured to exclude pests and are usually insulated. In other embodiments, the modular unit is constructed as a prefabricated unit at a remote manufacturing site and then transported, such as on a truck bed and/or "reefer" vessel, to the site of installation and use. In still further embodiments, the modular unit can be constructed at or proximal to the site of use, for instance using a kit that contains all of the components necessary for assembling the modular unit. Such a kit may include sub-modules that are assembled elsewhere, for instance to make final on-site assembly and installation simpler, faster, and/or more efficient.

According to various embodiments, the modular unit is constructed and the sections therein are configured to create "hygienic zoning" to facilitate safe food production. The layout is configured to present procedural flow of the food undergoing processing through the sections of the modular unit in an orderly manner, which helps to minimize or prevent food safety problems, such as cross contamination. For example, upon entering the modular unit through a first door, such as through the bay doors (or one bay door) at one end of the modular unit, the food is received in a refrigerated area suitable for receiving raw materials, such as a refrigerated section adjacent to a primary processing space/area, and optionally outfitted with storage facilities such as a rail system to suspend carcasses, shelving to receive boxes of produce or other comestibles, or a tank to receive liquids (such as milk).

After receipt, and optionally storage for some period of time in the refrigerator section, the food undergoes processing in a primary processing section connected to the refrigerated section. After primary processing in the primary processing section, in some embodiments, the food can exit the modular unit through a second door leading from the primary processing section. Alternatively, in other embodiments, the food is then moved to a separate, adjacent section for secondary processing steps; after secondary processing, the food then exits the modular unit through a door leading from the secondary processing section.

In representative embodiments, the modular units include a rail system to aid in food processing. In some embodiments, the rail system is configured to hang meat, such as a carcass or carcass parts, in the refrigerated receiving area, as well as to convey meat from the refrigerated section to the primary processing area. Workers utilizing the rail system to move carcasses and other heavy product will have a decreased incidence of lift and movement injury. For embodiments where the food to be processed is produce or other smaller items, a rail system is not necessary but optionally may still be used, though it may be to transport boxes or totes or other containment units that hold the food to be moved. For embodiments where the food to be processed is a liquid (such as milk), transportation of the comestible liquid may be accomplished using hoses, pipes, tanks, pumps, and the like.

It is appreciated that the segregated sections within the modular unit, as well as separated entry and exit doors, reduce the chances of contamination in food processing. In one example, where the food being processed is an animal carcass or carcass part, the carcass enters the refrigerated area in the modular unit, and, in some embodiments, where the receiving area includes a rail, the carcass or carcass part is hung on the rail. The carcasses or carcass parts optionally may be stored for a period of time in the refrigerator section, for instance to chill, or to age. To initiate processing, the carcass is moved into the adjacent primary processing section of the modular unit, for instance in order to be sectioned into primal, sub-primal, or individual retail cuts.

After primary processing, sectioned portions of meat from the animal carcass are, in some embodiments, moved to an adjacent secondary processing section of the modular unit, for further (e.g., value added) processing. After primary or secondary processing, the finished meat product(s) can exit the modular unit through a second door, separate from the door by which the original carcass(es) entered the unit. The separation of the ingress of raw product from the egress of finished product drastically reduces the chance of cross-contamination. The layout of the modular unit utilizes the concepts of food safety practices to create hygienic zoning for food production, thus by the natural use of the space within the modular units, workers are practicing food safety procedures and thereby creating a safer product.

It is appreciated that utilizing the doors native to a recycled shipping container or trailer can be very beneficial, as they are highly durable and can accommodate ingress of raw material as large as the full height of the units. According to various embodiments, doors between sections within the modular units are insulated, constructed of durable material, and generally provided with a window to permit viewing into the adjacent section without the need to open the door. It is also contemplated that the "door" from, for example, the refrigerated section into the primary processing section may be made of suspended strips (a strip curtain), to permit easy passage without needing to open or close a solid door, while substantially retaining any temperature differential between the two sections.

According to various embodiments, the modular units are lined (for instance, the inside surfaces of the ceiling, walls, and floor) with an appropriate, washable and substantially non-porous material that is safe for food, such as (stainless) steel or fiber-reinforced plastic (FRP) paneling. The unit lining can be constructed from other materials depending on the particular food undergoing processing. The lining generally will be smooth with gap-free welds. The lining surfaces can be cleaned either with water or aqueous solutions or suspensions, or, if appropriate due to the particular food undergoing processing, using a dry cleaning process.

According to various embodiments, the modular unit includes one or more connection points for a plumbing system. The connection point(s) can be configured to include options for a water inlet system, which, in some embodiments, can include a chilled water source and a heated water source. In some embodiments, the modular unit includes means for heating water (e.g., a rapid or in-line water heater system). The connection point(s) can also be configured to include options for connecting to a waste disposal system, such as sewage system for wastewater. In some embodiments, the drain system can be connected through a floor drain, for instance in the primary processing section of the unit. Where the modular unit is constructed from a recycled, pre-existing construction, the construction can be outfitted with connection point(s) for the plumbing system. Where the modular unit is prefabricated or is prepared as a kit for assembly, the connection point(s) for the plumbing system can be integrated into the prefabricated unit or assembly components.

According to various embodiments, the modular unit includes one or more connection point(s) and associated wiring for an electrical system. In some embodiments, the associated wiring is routed through one or more breakers. In other embodiments, the wiring is routed to one or more electrical outlets and/or a lighting system, which can be arranged in various configurations along the inner and/or outer surface of the modular unit. In still further embodiments, the wiring can be routed to environmental control system(s), which can be provided in various configurations to one or more of the sections within the modular unit. The connection point(s) and associated wiring for an electrical system can also be integrated into either a pre-existing recycled or prefabricated unit, or into the assembly components of a modular unit kit.

Because the unit can be utilized across food stuffs, it is customizable. It is contemplated in certain embodiments that the basic modular unit will have placement of water hookup, sewage hookup, electric hookup and lining of the interior remain relatively constant, while other aspects of the unit are selected for the end use intended. It is also contemplated that the general process flow of raw ingredients into the raw materials space, then into the production space and finally into the finished product or packing space can remain constant in all versions of the unit, as issues of cross contamination are paramount in food production.

Refrigerated (Cooler) Section/Area

One of the major bottlenecks of slaughter capacity is hanging and cooling space. Cooling large carcasses with the proper airflow and space to bring the temperature to within mandated guidelines is an energy and paperwork intensive process. If a mobile cooling room can be provided, it would increase the capacity of small slaughter facilities to operate.

According to various embodiments, modular units can be provided with cooling units that are built into, for instance, a standard truck trailer or storage container. This module in some instances is based on either a boxed refrigerated truck or a tractor trailer refrigerated truck, depending on the needs of the end user. Build out in accordance with the teachings of this disclosure would convert the truck into a USDA-compliant (or otherwise food processing-safe) cooling space, including providing an interior that is cleanable and inspectable.

Thus, in embodiments of the mobile comestibles processing unit there is provided a refrigerator section for receiving, cooling and/or storing food to be processed, such as an animal carcass or portions thereof, or in other embodiments fresh produce or milk or other edible food subject to (further) processing. The refrigerator section is insulated, and lined on its interior walls, ceiling and floor as described above with a non-porous, cleanable surface. In some embodiments, the refrigerated section can be directly accessed through the first means of entering (e.g., ingress, such as a door) the mobile food processing unit.

The refrigerated section of the various modular units preferably has non-porous flooring constructed from (or covered with) plate steel or epoxy, with walls constructed from (or covered with) either steel or FRP. All surfaces are non-porous, and any lighting in the refrigerator section is configured to be protected, waterproof, and shatter resistant.

In example modular units, two cooling units are installed, one in or connected to the primary processing room, one in or connected to the raw materials receiving section (the refrigeration section).

Primary Processing Section/Area

Every small slaughterhouse has a cut and wrap facility. In addition, some mid-size farms house their own cut and wrap facilities, and the demand is high for more such facilities to be created. Lack of a cut and wrap facility thus represents another major bottleneck in providing local meat.

According to various embodiments, the modular units provided herein include a section/area, referred to as the primary processing area (or section) in which meat (or, in other embodiments, other raw food stuff) is subject to primary processing. This may include the cutting and wrapping of retail meat cuts, the grinding and mixing of sausage, and so forth. The section of the unit is wired with electrical connections with capabilities for both 110v and 220v, to accommodate heavy duty processing equipment. In some embodiments, a sink, such as a triple sink, is provided in this section in certain example modular units, as well as optimally a wall-mounted hose unit for cleaning. Hot water may be provided, for instance, by electrical on-demand hot water unit(s) mounted, for instance, near or beneath the triple sink.

In various embodiments of the modular units containing a secondary processing section, there are only be two ingress/egress points to the modular unit, with a second egress point being the door from the from the non-refrigerated (secondary) processing section to the exterior. For such embodiments, there will be an access point between the first processing area and the secondary processing area. In such embodiments, product will enter the modular unit from the exterior through a first door and be held/processed in the refrigerated and/or primary (and cooled) sections until process dictates transfer to the secondary processing room, for instance on wheeled carts. Storage of product in this secondary section will usually be less than or equal to one week. An optional hard plastic (vinyl) curtain may be installed between the receiving (refrigerated) area and cold (primary) processing area as well as between the first processing area and the secondary processing area, as need dictates for thermal protection, also to help safeguard against physical and pathogenic hazards. Such a divider will also aid in the simplification of cleaning the space.

One example modular cut and wrap unit is based on (for instance, contained within) a shipping container or truck trailer (such as a refrigerated/"reefer" truck trailer) that houses various devices useful for processing meat, such as a grinder, patty maker, tumbler, and stuffer, along with dry storage and finished product storage. The unit is constructed to be readily cleanable and inspectable, for instance by being lined on all interior walls, ceiling, and floor with a substantially non-porous, readily cleanable surfaces—such as stainless steel, FRP or other art-recognized food safe and cleanable surface.

Secondary Processing Section/Area

The demand for charcuterie (smoked and further processed meat products) is growing. Every foodie restaurant is clamoring for a charcuterie plate, and local food customers are increasing the demand as well.

Thus, optionally, the modular units provided herein may also include a secondary processing section or area, intended for further processing (e.g., value added processing) of foods first processed in the primary processing area. This section has the potential to require refrigeration units, can be insulated and outfitted (e.g., lined) with the same type of non-porous cleanable walls, flooring, also non-porous and cleanable, and ceiling as the refrigerated sections in the primary unit. This section can be wired for electrical connections (computer, processing devices such, kitchen tools, etc.) and lit, for instance using LED panels. In some embodiments, this section of a Locker Unit is provided with temperature and/or humidity controlled compartments, storage, a smoker, and so forth for secondary processing of meat or other comestible items.

This section's primary function is for the processing, fashioning, and production of Value Added Products from the incoming and moderately processed raw materials incoming from the refrigerated sections of the unit. This secondary processing section can be directly connected to the refrigerated section via an insulated door which is, in some instances, wide enough to accommodate a heavy duty wheeled cart. This section is lined with cleanable material, much as described above, and may be lined with the same non-porous (e.g., steel or epoxy) flooring as the refrigerated section and the primary processing section, with similar walls installed. The secondary processing section is outfitted with lighting, such as LED panel lighting installed flush with the ceiling with a cleanable face, and is wired for electrical connections for various equipment. It is also contemplated that the secondary processing section can include a hand-washing sink installed with potable water connection, and optionally with a water heating unit.

Office Section/Area

According to various embodiments, the modular unit can be provided with an office section. This section's function is that of an office space for general bookkeeping and organizational needs of the business operating out of the unit. This may also be where records for food safety and business purposes are held and stored, for instance in electronic (digital) format. Aspects of some embodiments can include a fold-down desk and room for a lockable file cabinet to comply with USDA regulations.

This section of the unit has an ingress from the exterior, as well as access to the non-refrigerated (secondary) processing space via an insulated door. The office section functions as an area for donning and doffing of food safety protective clothing, with hooks and space for personal protective equipment provided. Such protective clothing will be utilized by any and all persons passing through the insulated door to the secondary processing space. The insulated door, in some embodiments, is constructed from glass (or has glass windows) to allow for USDA (or other) inspectors to view the secondary processing area without the need for donning protective clothing and entering the space. Observation through a window decreases the chance of cross contamination.

The office section is wired for electrical connections (computer, etc.) and lit, for instance by similar lighting to the processing area with LED panels. The walls of the office section are constructed from the same type of non-porous cleanable walls, flooring, and ceiling as the previously described sections of the unit, to allow for easy cleaning and compliance with regulations.

The various embodiments and aspects of the modular unit, as described herein, provide numerous benefits and advantages. The modular unit enables mobile processing of comestible products. The modular unit provides for hygienic zoning of work areas to facilitate flow and food safe production within the units. The modular units provide cleanable surfaces and drainage that can be connected to existing sewerage systems. The modular unit enables HVAC for proper temperature control of the food to be processed and for hanging and cooling of carcasses and food to be processed. The modular unit enables interior flow of people, the product being processed, and air flow to transverse the modular unit layout in a specific manner and to support segregation of product by time and space and thus reduce microbial and chemical food safety hazards. The modular unit can contain some or all of the components necessary to process food from a raw state, such as an animal carcass, fish or seafood, or freshly harvested produce, through primary and (optionally) secondary or value added production. The modular unit includes a separate space for hanging and cooling of the food being processed. The modular nature of the unit itself (for example, utilizing existing shipping containers) enables small(er) producers to compete in the local food market by offering a cheaper, more accessible and more mobile option for processing units. The modular unit complies with various regulations: is Global Food Safety Initiative (GFSI) auditable; U.S. Department of Agriculture (USDA), Food and Drug Administration (FDA) or state inspectable. By providing an office space for bookkeeping and storage of food safety protective clothing, and optional windows through which to view the processing areas of the unit without entry, the modular unit facilitates compliance with regulations and the inspection of the unit by local, state, federal or other authorities. The modular unit enables the distribution of safe, wholesome, meat (or other comestible products) into local markets.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only. Rather, the scope of the invention is defined by the following claims.

We claim:

1. A modular structure for the processing of comestible or food products, the modular structure configured with separate sections to create hygienic zoning of food to be processed and configured with a layout that optimizes flow of the food product undergoing processing through the separate sections in an orderly manner, which minimizes cross contamination of the food product from one section to another section and which also minimizes contamination of final processed food product by any person processing the comestible products, the modular structure comprising:

an ingress from an exterior of the modular structure at one end of the modular structure;

a first section configured for receiving, refrigerating and storing food product to be processed, that is directly accessible through the ingress, the first section including an overhead rail system configured to hang the food product with the overhead rail system so that it can be cleaned, stored, and moved along the overhead rail system through the first section to a primary processing section for processing;

the primary processing section for processing the food product, that is connected to and isolated from the first section to provide the separate primary processing section and to provide the hygienic zoning, the primary processing section also including the overhead rail system that continues from the first section and that travels through a portion of the primary processing system to a work station so that the comestible product can be worked on at the primary work station while hanging from the overhead rail system.

2. The modular structure of claim 1, wherein at least the first section is configured to be climate controlled by at least one refrigeration unit.

3. The modular structure of claim 2, wherein at least the primary processing section is also configured to be climate controlled by at least one refrigeration unit.

4. The modular structure of claim 3, wherein at least the first section and the primary processing section are insulated.

5. The modular structure of claim 1, wherein walls, ceiling, and floor of at least the first section and the primary processing section are lined on with a non-porous, cleanable surface.

6. The modular structure of claim 5, wherein the primary processing area is wired with one or more electrical connections and lighting.

7. The modular structure of claim 5, wherein the primary processing section has a drain that is configured to be connectable to a sewer system or other waste disposal system.

8. The modular structure of claim 1, further comprising a secondary processing section that is connected to but isolated from the primary processing section, that is configured for additional processing of the food to be processed after being processed in the primary processing area.

9. The modular structure of claim 8, wherein the secondary processing section is configured to be cooled by at least one cooling unit and is insulated.

10. The modular structure of claim 8, wherein walls, ceiling, and floor of the secondary processing section are lined on with a non-porous, cleanable surface.

11. The modular structure of claim 8, wherein the secondary processing area is wired with one or more electrical connections and lighting.

12. The modular structure of claim 11, wherein the secondary processing section contains one or more of a work table, storage shelving, a storage cabinet, a refrigerator, a freezer, an oven, a sink, a vacuum sealer, and a smoker.

13. The modular structure of claim 1, further comprising an office section either directly or indirectly connected to and isolated from the primary processing section, the office section having a second ingress/egress from the exterior of the modular structure that provides for the person processing the food to enter the modular structure at a second end of the modular structure and to gain access to the separate sections from the opposite end of the modular structure so as to provide the layout that minimizes contamination of final processed food product by any person processing the comestible products.

14. The modular structure of claim 13, the office section wired with one or more electrical connections and for lighting.

15. The modular structure of claim 1, further comprising a second ingress from the exterior of the structure into the interior at a second end of the modular structure.

16. The modular structure of claim 1, wherein the modular structure is fabricated from a commercial shipping container.

17. The modular structure of claim 1, further comprising at least one additional separate storage section.

18. The modular structure of claim 1, wherein the comestible product is an animal carcass and the modular structure is configured to process animal carcasses.

19. The modular structure of claim 18, wherein the primary processing section contains one or more of a work table, a meat grinder, a meat mixer/tumbler, a sink, and a storage cabinet.

20. The modular structure of claim 19, wherein the modular structure is also configured to process fish and/or seafood.

21. The modular structure of claim 19, wherein the modular structure is configured to process produce.

22. The modular structure of claim 19, wherein the modular structure is configured to process a liquid.

23. The modular structure of claim 1, wherein the modular structure is a substantially rectangular structure, having first and second shorter walls and first and second longer walls and the ingress is in a first shorter wall.

24. The modular structure as claimed in claim 1, configured for the processing of animal carcasses, the modular structure further comprising:
  a substantially rectangular structure, having a floor, a ceiling, and four exterior walls including first and second shorter walls and first and second longer walls;
  a first doorway in the ingress in a first shorter wall of the structure;
  wherein the first section is a refrigerated section for receiving, cooling and storing animal carcasses or portions thereof to be processed, that is directly accessible through the first doorway, the refrigerated section being lined on its interior walls, ceiling, and floor with a non-porous, cleanable surface;
  wherein the primary processing section is for processing the animal carcasses to provide processed meat, the primary processing section having a floor drain that is connectable to a sewer system or other waste disposal system, the primary processing section being lined on its interior walls, ceiling, and floor with a non-porous, cleanable surface, the primary processing section having one or more electronic outlets and lighting;
  a secondary processing section for additional processing of the processed meat from the primary processing area, that is connected directly to the primary processing section and isolated from the primary processing section with an intervening doorway, that is lined on its interior walls, ceiling, and floor with a non-porous, cleanable surface, and that has one or more electronic outlets and lighting;
  a second doorway from the exterior of the structure into the interior in a second shorter wall of the structure; and
  an office section, directly accessible through the second doorway, that is connected to and separate from the secondary processing section, that is wired with one or more electrical connections, and lighted, the office section being connected to the secondary processing section by a closeable door in an interior wall between the two sections.

25. The modular structure of claim 24, wherein the substantially rectangular structure comprises a commercial shipping container.

26. The modular structure of claim 24, wherein the primary processing section contains one or more of a work table, a meat grinder, a meat mixer/tumbler, a sink, and a storage cabinet.

27. The modular structure of claim 24, wherein the secondary processing section contains one or more of a work table, storage shelving, a storage cabinet, a refrigerator, a freezer, an oven, a sink, a vacuum sealer, and a smoker.

* * * * *